United States Patent [19]

Markle

[11] Patent Number: 5,230,031
[45] Date of Patent: Jul. 20, 1993

[54] BARRIER FOR A CONNECTOR

[75] Inventor: David R. Markle, Paoli, Pa.

[73] Assignee: Biomedical Sensors, Ltd., High Wycombe, England

[21] Appl. No.: 887,986

[22] Filed: May 22, 1992

[51] Int. Cl.$^5$ .............................................. G02B 6/38
[52] U.S. Cl. ........................................ 385/56; 385/60; 385/69
[58] Field of Search ............................ 385/56, 60, 69

[56] References Cited

U.S. PATENT DOCUMENTS

| | | | |
|---|---|---|---|
| 5,007,704 | 4/1991 | McCartney | 385/56 |
| 5,109,452 | 4/1992 | Selvin et al. | 385/56 X |

FOREIGN PATENT DOCUMENTS 0162921  9/1983  Japan ...................................... 385/56

Primary Examiner—John D. Lee
Assistant Examiner—Phan T. Heartney
Attorney, Agent, or Firm—Peter C. Richardson; Lawrence C. Akers; Mark Dryer

[57] ABSTRACT

A barrier for a connector defining a junction between an interengaging member and a conjugating part, which barrier comprises a resilient sleeve shaped to snugly fit a proximal portion of reduced cross section which abuts a proximally facing shoulder and captures an open end of an elastic open ended sheath therebetween.

1 Claim, 1 Drawing Sheet

BARRIER FOR A CONNECTOR

FIELD OF THE INVENTION

This invention relates to a barrier for a connector and more particularly an elastic open ended sheath for the junction between an interengaging member and a conjugating part that are the components of the connector.

BACKGROUND OF THE DISCLOSURE

Connectors to easily and repeatedly attach and disconnect conductors without tools or the to unfasten permanent connections are in use in many areas and applications. In particular, plugs and receptacles are used in every home and business for electrical circuits. Conductors other than electrical are sometimes split with connectors, where required. Light transmission through a fiber optic may need a simple coupling that can be attached and disconnected repeatedly without concern about the quality of the connection.

Seals for weather proofing connectors are a problem in many environments. With medical devices the need to keep connections made by a connector clean and free from dirt and fluids is particularly important since a human life could depend on the quality of the connection making able the transmission through the conductors connected thereby the required signal, energy or the like.

Moreover, the use of instruments for health care with disposables associated with a particular patient is common and most important now that transmitted infection can be terminal. Therefore, connectors isolate frequently used instruments from the one time disposable use patient applied part of the diagnostic device or treatment. Many applications include electrodes, tranducers, drug delivery devices and the like require connectors.

Stray electrical currents have to be kept away from the patient and the instruments use in the hospital environment so double electrical insulation is a recognized advantage. Frequently, the conditions around a hospital or operating room include fluids in the form of medications, bodily fluids and cleaning materials all of these thing are messy and can destroy the connection and/or hinder the continued use of the connector.

Cumbersome seals which are difficult to use, costly to add and present other problems are avoided by the barrier of the disclosure herein.

SUMMARY OF THE INVENTION

A barrier for a junction between an interengaging member and a conjugating part preferably has the interengaging member with a body which terminates in a distal end. The distal end most preferably has pieces thereon for engaging and an edge thereabout. The barrier also preferably has the conjugating part which has a handle reaching to a terminal face having a periphery thereabout and having features associated therewith for matingly engaging with the pieces on the distal end. The body or the handle may have a proximal portion of reduced cross section which terminates in a centrally positioned shoulder facing proximally. A resilient sleeve, which has an internal passage shaped to snugly fit the proximal portion Of reduced cross section and an abutting end to abut the proximally facing shoulder for capture thereagainst.

The interengaging member and the conjugating part form a connector when the distal end pieces engage the terminal face features mating at the junction therebetween. The connector preferably has a key and a keyway therebetween to prealign the distal end pieces and the terminal face features. The distal end pieces and the terminal face features preferably include conductors for electrical circuits and optical paths.

The junction, which is formed about and between the interengaging member and the conjugating part when joined with the pieces and the features when fully united with the distal end of the body against the terminal face, preferably includes releasable locking means. The releasable locking means are located for and accessible to movement when covered over by the elastic open ended sheath extended over the body to the handle or over the handle to the body thereby covering the junction so when covered it may be locked or released while protected within the elastic open ended sheath.

The elastic open ended sheath when appended to the body or the handle, is capable of being extended over the body to the handle or over the handle to the body for covering the junction and is preferably gatherable to uncover the junction and to reveal either the handle or the body. The elastic open ended sheath most preferably forms a rolling seal with the end opposite the captured end everted and rolled back along the extended sheath to form a compact toroidal shaped accumulation. The sheath may preferrably be formed of a latex material stretched slightly to fit about the handle and body when extended.

The method of assembling the barrier to the body of the interengaging member or handle of the conjugating part for placement over the junction therebetween comprises the steps of placing the abutting end of the elastic open ended sheath about either the body or the handle, attaching the open end to either the body or the handle, and gathering the remainder of the elastic open ended sheath toward the body or the handle to which it is attached in position for placement over the junction toward the other. The step of gathering preferably includes the further steps of revealing either the handle or the body by rolling the elastic open end sheath, forming the rolling seal with the end opposite the captured end by everting and rolling back along the extended sheath to form the compact toroidal shaped accumulation The method preferably may also have the added steps of attaching or placing the resilient sleeve with an internal passage shaped to snugly fit a proximal portion of the handle or body having the reduced cross section, abutting the proximally facing shoulder with an abutting end of the sleeve, and capturing the elastic open ended sheath between the abutting end and the shoulder.

The method for using the barrier for the junction between the interengaging member having the body terminating in the distal end, is performed with steps including extending the elastic flexible sheath from the handle to the body or from the body to the handle for covering the junction, and gathering the elastic flexible sheath from the body toward or the handle from the handle toward the body uncovering the junction and for respectively revealing either the handle or the body when extended over the body to the handle or over the handle to the body.

DETAILED DESCRIPTION OF THE INVENTION

The claims are not limited to the structure for a barrier 10 described and illustrated by way of specific example and the method of assembly and use specifically disclosed The claims herein, as amended or considered in view of skilled artisans in the Field prior to these inventions.

Figure 1:
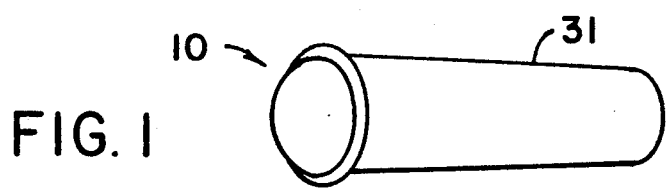
FIG. 1 is a perspective view of the barrier as would be seen if removed from the connector; for example., before it is used or applied.
Figure 2:
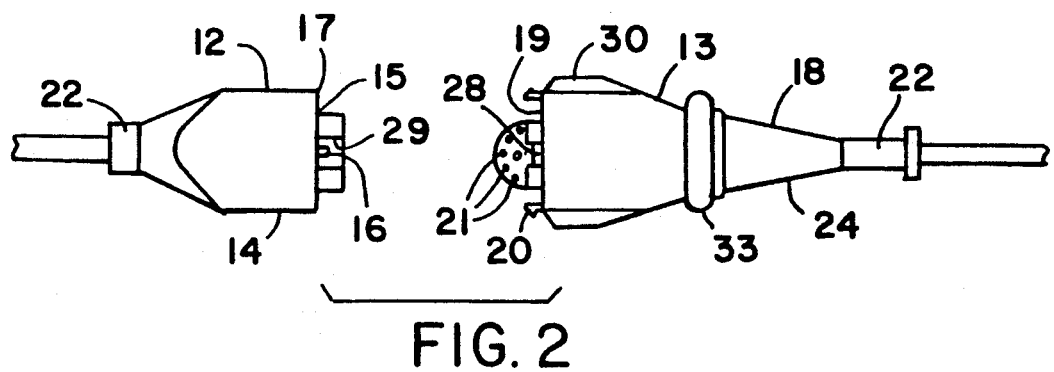
FIG. 2 is a perspective view of the barrier for the connector illustrating an elastic open ended sheath for a junction between an interengaging member and a conjugating part that are the components of the connector.
Figure 3:
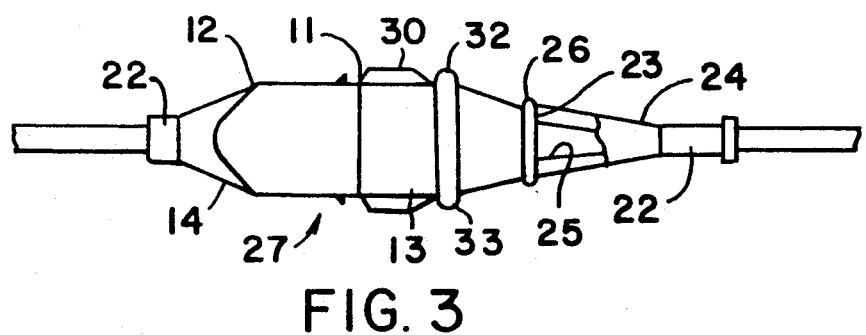
FIG. 3 is a side view partially in section of the connector of FIG. 2 but the interengaging member and the conjugating part are shown engaged and the area with a reduced cross section is shown where the sleeve is cut away for illustrative purposes.

The barrier 10 in FIG. 1 is for a junction 11 in FIG. 3 between an interengaging member 12 and a conjugating part 13. The interengaging member 12 has a body 14 which terminates in a distal end 15. The distal end 15 most preferably has pieces 16 thereon in FIG. 2 for engaging and an edge 7 thereabout. The conjugating part 13 in the preferred embodiment has a handle 18 reaching to a terminal face 19 with a periphery 20 in FIG. 2thereabout and features 21 associated therewith for matingly engaging with the pieces 16 on the distal end 15. The body 14 or the handle 18 may have a proximal portion 22 of reduced cross section which terminates in a centrally positioned shoulder 23 facing proximally. While only one of the mentioned alternatives is shown i.e. proximal position 22 reduced and shoulder 23 in the Figure it is appreciated that skilled artisans will understand that the reverse of that shown can be accomplished as explained herein. A resilient sleeve 24, which has an internal passage 25 shaped to snugly fit the proximal portion 22 of reduced cross section and an abutting end 26 to abut the proximally facing shoulder 23 for capture thereagainst as shown in FIG. 2.

The interengaging member 12 and the conjugating part 13 form a connector 27 when the distal end 15 pieces 16 engage the features 21 mating to form the junction 11 therebetween as seen in FIG. 3. The connector 27 preferably has a key 28 and a keyway 29 therebetween to prealign and/or prevent rotation between the distal end 15, pieces 16 and the terminal face 19 features 21. The distal end 15 pieces 16 and the terminal face 19 features 21 preferably include conductors with, for example, electrical circuits and optical paths.

The junction 11 is in the preferred embodiment formed about and between the interengaging member 12 and the conjugating part 13 when the pieces 16 and the features 21 are joined. The junction is fully united when the distal end 15 of the body 14 is against the terminal face 19. A releasable locking means 30 located on the body 14 for and accessible to movement when covered over by the barrier 10. In the preferred form the barrier 10 is an elastic open ended sheath 31 shown in FIG. 1 and is designed for extending over the body 14 to the handle 18 or over the handle 18 to the body 14 thereby covering the junction 11. In the FIGS. 2 through 4, the sheath is shown extending from the handle 18 to the body 14. The covered junction 11 may be locked or released by the releasable locking means 30 while within the elastic open ended sheath 31.

Figure 4:
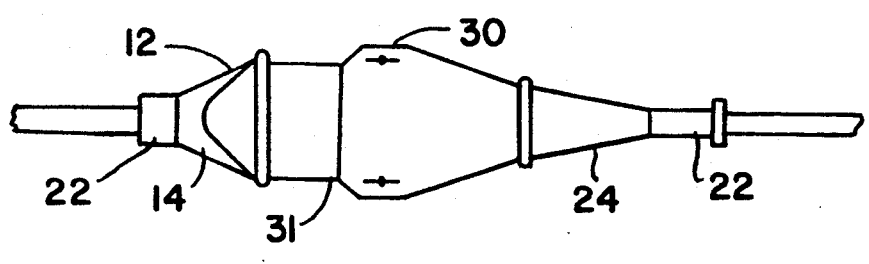
FIG. 4 is a side view as in FIG. 3 but the elastic open ended sheath for covering the juncture, is shown rolled out thereover to protect and seal the junction.

The elastic open ended sheath 31 is preferably gatherable to uncover the junction 11 and to reveal either the handle 18 or the body 14. The elastic open ended sheath 31 most preferably forms a rolling seal 32 with its end opposite the captured end everted and rolled back along the extended sheath 31 to form a compact toroidal shaped accumulation 33 sheath 31 may in the preferred embodiment be formed of a latex material stretched slightly to fit about the handle 18 and body 14 when extended as shown in FIG. 4.

The method of assembling the barrier 10 to the body 14 of the interengaging member 12 or handle 18 of the conjugating part 13 for placement over the junction 11 therebetween may have the steps of placing the elastic open ended sheath 31 over the reduced section of the proximal portion 22 on either the body 14 or the handle 18, placing the abutting end 26 of the sleeve 24 to capture the elastic open ended sheath 31 against the shoulder 23 of either the body 14 or the handle 18, and gathering the remainder of the elastic open ended sheath 31 toward the body 14 or the handle 18 to which it is attached for placing the sheath 31 in position for placement over the juncture 11 and toward the other. The step of gathering preferably includes the further steps of revealing either the handle 18 or the body 14 by rolling the elastic open ended sheath 31, forming the rolling seal 32 with the end opposite the captured end by everting and rolling back along the extended sheath 31 to form the compact toroidal shaped accumulation 33.

The method preferably may also have the added steps of attaching of placing the resilient sleeve 24 with an internal passage 25 shaped to snugly fit the proximal portion 22 of the handle 18 or body 14 having the reduced cross section, abutting the proximally facing shoulder 23, and capturing the elastic open ended sheath 31 against the shoulder 23 with the abutting end 26.

The method for using the barrier 10 for the junction 11 between the interengaging member 12 having the body 14 terminating in the distal end 15, is performed with steps including extending the elastic flexible sheath 31 from the handle 18 to the body 14 or from the body 14 to the handle 18 for covering the junction 11, and gathering the elastic flexible sheath 31 from the body 14 toward or the handle 18 from the handle 18 toward the body 14 for uncovering the junction 11 and for respectively revealing either the handle 18 or the body 14. The method may be reversed by extending the sheath 31 over the body 14 to the handle 18 or over the handle 18 to the body 14.

What is claimed is:

1. A barrier 10 for a connector 27 formed from an interengaging member 12 and a conjugating part 13 which define a junction 11 when engaged, comprising:

an interengaging member 12 having a body 14 terminating in a distal end 15, said distal end 15 having pieces 16 thereon and an edge 17 thereabout;

a conjugating part 13 having a handle 18 reaching to a terminal face 19 having features 21 associated therewith for matingly engaging with said pieces 16 and having a periphery 20 thereabout, said body 14 or said handle 18 with a proximal portion 22 of reduced cross section terminating in a centrally positioned proximally facing shoulder 23, said interengaging member 12 and said conjugating part 13 forming said connector 27 when said distal end 15 pieces 16 engage said terminal face 19 features 21 mating at said junction 11 therebetween, said connector 27 having a key 28 and a keyway 29 therebetween to prealign said distal end 15 pieces 16 and said terminal faced 19 features 21, said distal end 15 pieces 16 and said terminal face 19 features 21 including optical paths and electrical circuits;

a junction 11 formed about and between said interengaging member 12 and said conjugating part 13 when joined with said pieces 16 and said features 21 fully united with said distal end 15 against said terminal face 19, said junction 11 including releasable locking means 30; an elastic open ended sheath 31 appended to said body 14 or said handle 18 and capable of being extended over said body 14 to said handle 18 or over said handle 18 to said body 14 for covering said junction 11 and thereafter said elastic open ended sheath 31 gatherable to uncover said junction 11 and for revealing either said handle 18 or said body, said elastic open ended sheath 31 forming a rolling seal 32 with the end opposite the captured end everted and rolled back along the extended sheath 31 to form a compact toroidal shaped accumulation 33, the elastic open ended sheath 31 being formed of a latex material and being stretched slightly to fit about said handle 18 and body 14 when extended, said releasable locking means 30 located for and accessible to movement when covered over by said elastic open ended sheath 31 extended over said body 14 to the handle 18 or over said handle 18 to said body 14 covering the junction 11 so the covered junction may be locked or released while within said elastic open ended sheath 31 and a resilient sleeve 24 having an internal passage 25 shaped to snugly fit the proximal portion 22 of reduced cross section abutting said proximally facing shoulder 23 and capturing an open end of said elastic open ended sheath 31 therebetween.

\* \* \* \* \*